(12) United States Patent
Anderson et al.

(10) Patent No.: US 8,616,740 B2
(45) Date of Patent: Dec. 31, 2013

(54) DISTRIBUTED LIGHTING ASSEMBLY

(75) Inventors: James Burr Anderson, Cookeville, TN (US); Alexis Antonio Silva Perez, Rochester Hills, MI (US)

(73) Assignee: Federal-Mogul Corporation, Southfield, MI (US)

( * ) Notice: Subject to any disclaimer, the term of this patent is extended or adjusted under 35 U.S.C. 154(b) by 536 days.

(21) Appl. No.: 12/814,711

(22) Filed: Jun. 14, 2010

(65) Prior Publication Data

US 2010/0315826 A1  Dec. 16, 2010

Related U.S. Application Data

(60) Provisional application No. 61/186,667, filed on Jun. 12, 2009.

(51) Int. Cl.
*B60Q 3/02* (2006.01)
*B60Q 3/06* (2006.01)

(52) U.S. Cl.
USPC ........... 362/487; 362/488; 362/489; 362/559; 362/511

(58) Field of Classification Search
USPC .................. 362/487, 488, 559, 576, 627, 511
See application file for complete search history.

(56) References Cited

U.S. PATENT DOCUMENTS

| | | | |
|---|---|---|---|
| 4,446,508 A | 5/1984 | Kinzie | |
| 6,193,399 B1 | 2/2001 | Hulse | |
| 6,234,439 B1 | 5/2001 | Townsend et al. | |
| 6,594,417 B1 | 7/2003 | Hulse | |
| 6,637,709 B1 | 10/2003 | Zotter et al. | |
| 6,651,128 B1 | 11/2003 | Gulick | |
| 6,880,948 B2 | 4/2005 | Koch et al. | |
| 6,896,387 B2 | 5/2005 | Renfro | |
| 6,915,062 B2 | 7/2005 | Hulse et al. | |
| 7,150,550 B2 | 12/2006 | Bogdan et al. | |
| 7,201,508 B2 | 4/2007 | Misaras | |
| 7,210,829 B2 | 5/2007 | Okazaki et | |
| 7,237,933 B2 | 7/2007 | Radu et al. | |
| 7,265,306 B2 | 9/2007 | Radu | |
| 7,287,885 B2 | 10/2007 | Radu et al. | |
| 7,299,892 B2 | 11/2007 | Radu et al. | |
| 7,350,949 B2 * | 4/2008 | Meinke et al. | 362/540 |
| 7,507,008 B2 | 3/2009 | Clauw et al. | |
| 7,575,349 B2 | 8/2009 | Bucher et al. | |
| 7,575,803 B2 * | 8/2009 | Hirai et al. | 428/402 |
| 2003/0223250 A1 | 12/2003 | Ballen | |
| 2007/0258255 A1 | 11/2007 | Kessler et al. | |
| 2008/0158900 A1 | 7/2008 | Showalter et al. | |
| 2008/0253140 A1 | 10/2008 | Fleischmann et al. | |
| 2008/0266769 A1 | 10/2008 | Massaro et al. | |

FOREIGN PATENT DOCUMENTS

| | | |
|---|---|---|
| EP | 1895230 A2 | 3/2008 |
| JP | 2003-028677 A | 1/2003 |
| JP | 2006-214953 A | 8/2006 |

* cited by examiner

*Primary Examiner* — Stephen F Husar
*Assistant Examiner* — James Cranson, Jr.
(74) *Attorney, Agent, or Firm* — Robert L. Stearns; Dickinson Wright, PLLC

(57) ABSTRACT

The lighting assembly (20) includes a light guide (22) formed of a resin material propagating light through internal reflection. A housing (28) surrounds the light guide (22) and maintains the light guide (22) in a predetermined position. A light transmissive coating (24), such as a vacuum metalized coating, is disposed on the light guide (22) and faces outwardly of the housing (28). The light transmissive coating (24) disguises the resin light guide (22) so that the light guide (22) appears to be a metallic trim. A non-light transmissive coating (26), such as a paint, appearing to be the same material as the light transmissive coating (24), may be disposed on the light guide (22) adjacent the light transmissive coating (24).

20 Claims, 5 Drawing Sheets

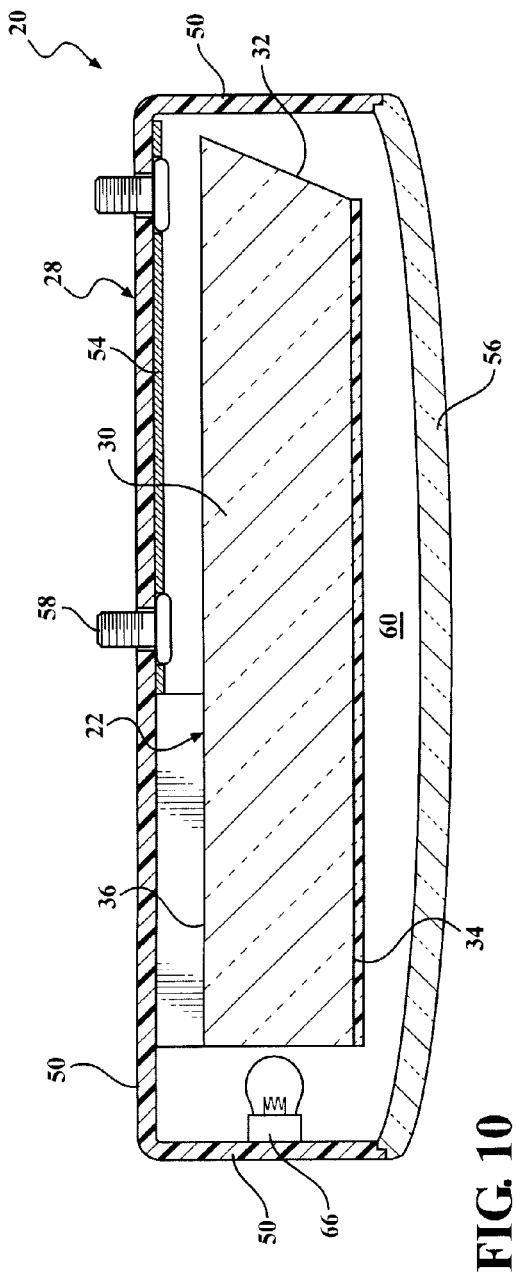
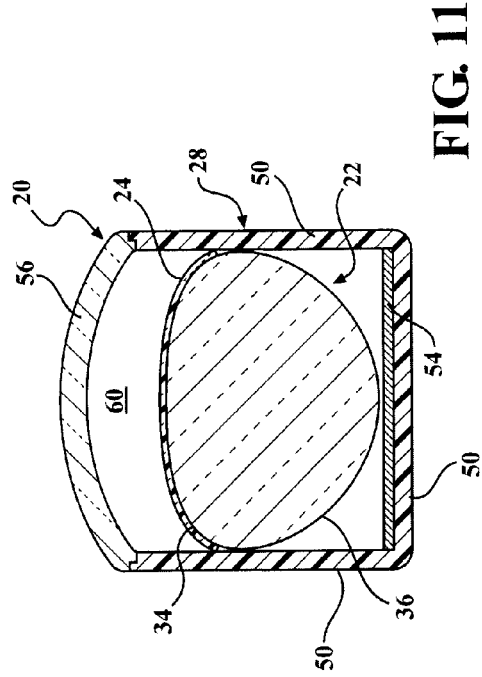

DISTRIBUTED LIGHTING ASSEMBLY

RELATED APPLICATIONS

This application claims priority to U.S. Provisional Application Ser. No. 61/186,667, filed Jun. 12, 2009, which is incorporated herein by reference.

BACKGROUND OF THE INVENTION

1. Field of the Invention

The invention relates to distributed lighting assemblies, and more particularly to lighting assemblies including light guides.

2. Description of the Prior Art

Distributed lighting techniques provide several advantages over conventional lighting techniques, including low power consumption, extended life, heat reduction at the location where the light is emitted, and increased design flexibility. Thus, distributed lighting applications are used in a variety of vehicle applications. For example, U.S. Pat. No. 6,594,417, assigned to Federal-Mogul Worldwide, Inc., discloses an elongated waveguide for lighting the interior of a vehicle, and U.S. Pat. No. 6,234,439, also assigned to Federal-Mogul Worldwide, Inc., discloses a waveguide disposed along the perimeter of a cup holder in the center counsel of a vehicle. In addition to functional efficiency, lighting assemblies should also be visually appealing, particularly those used in passenger vehicles. Potential buyers are more likely to purchase a vehicle with an attractive exterior and ambiance in the passenger compartment.

SUMMARY OF THE INVENTION AND ADVANTAGES

The lighting assembly is both functionally efficient and visually appealing. The assembly includes a light guide formed of a light transmissive material for transmitting light therethrough and a housing extending along and maintaining the light guide in a predetermined position. A light transmissive coating is disposed on the light guide facing outwardly of the housing. The lighting assembly is formed by applying the light transmissive coating on the light guide, and extending the light guide along the housing so that the light transmissive coating faces outwardly of the housing.

The light transmissive coating disguises the light guide so that the light guide appears to be a trim component in well-lit environments while simultaneously allowing light to transmit therethrough in dark environments. The light transmissive coating can include a variety of different compositions and appearances. The light transmissive coating can be a vacuum metalized coating, so that the light guide appears to be a reflective metallic trim, rather than a dull resin material. The light guide of the assembly can be formed to include a variety of different shapes. For example, the light guide can be disposed along the perimeter of a cup holder and appear to be a trim component in well-lit environments while providing light so that a passenger can locate the cup holder in dark environments. The lighting assembly can be used in a variety of other applications, particularly passenger vehicle applications. The assembly is used in used in door handles, panel trims, center counsels, instrument panels, running lights, and other interior and exterior vehicle applications.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 10 is a cross-sectional view of the lighting assembly;

FIG. 11 is another cross-sectional view of the lighting assembly of FIG. 10;

DETAILED DESCRIPTION OF THE INVENTION

Figure 1:
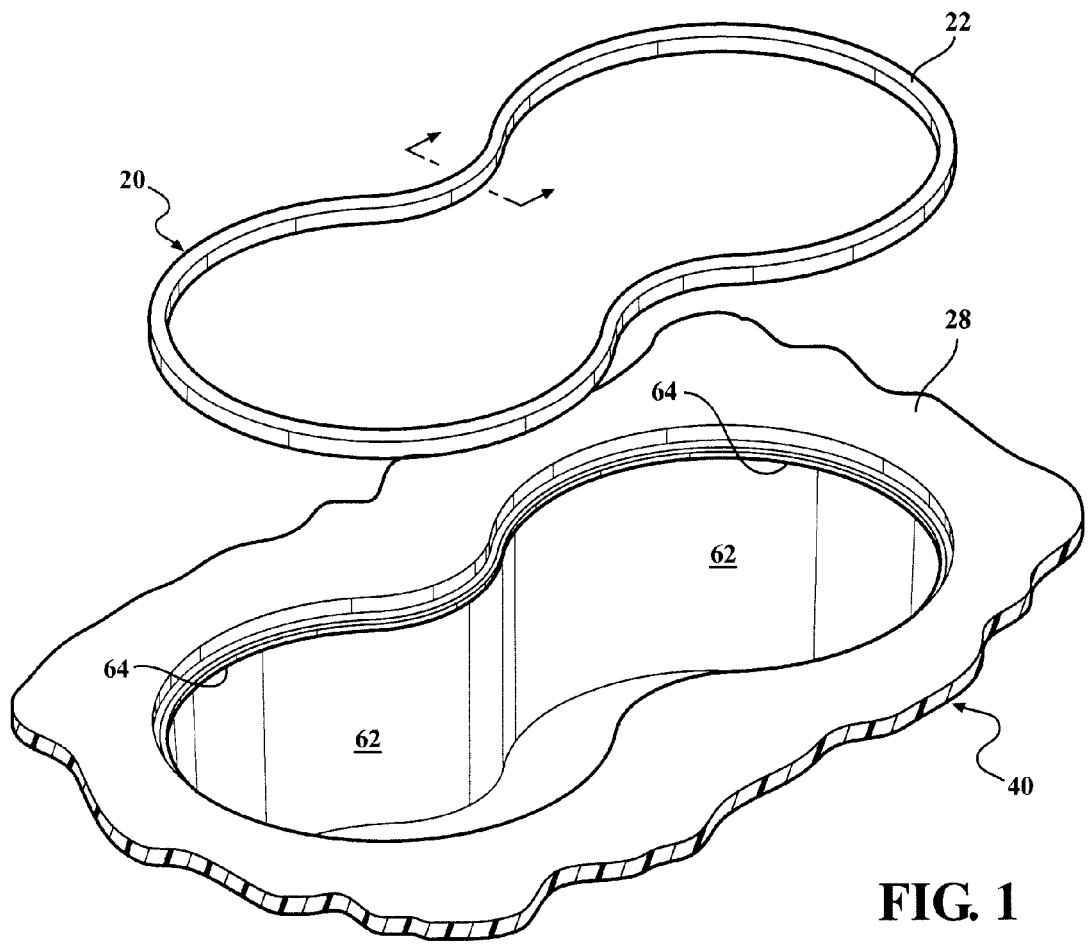
FIG. 1 is an exploded view of a cup holder application including a lighting assembly.

Referring to the Figures, wherein like numerals indicate corresponding parts throughout the several views, a lighting assembly 20, such as a trim assembly 20 for an automotive vehicle, is generally shown at 20. The lighting assembly 20 includes a light guide 22 transmitting light therethrough and a light transmissive coating 24 disposed on the light guide 22. A non-light transmissive coating 26 may be disposed on the light guide 22 adjacent the light transmissive coating 24 to prevent light from transmitting therethrough. A housing 28 maintains the light guide 22 in position with the light transmissive coating 24 facing outwardly of the housing 28.

Figure 2:
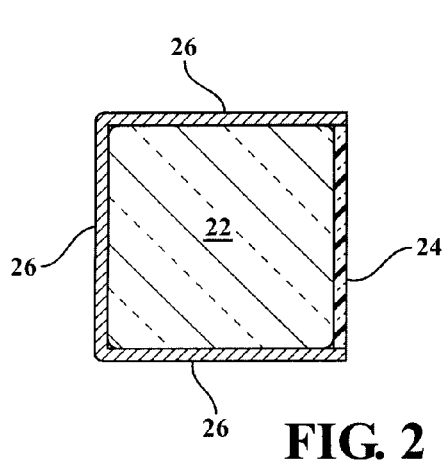
FIG. 2 cross-sectional view of FIG. 1 along line 2, showing a light transmissive coating and a non-light transmissive coating on a light guide.
Figure 3:
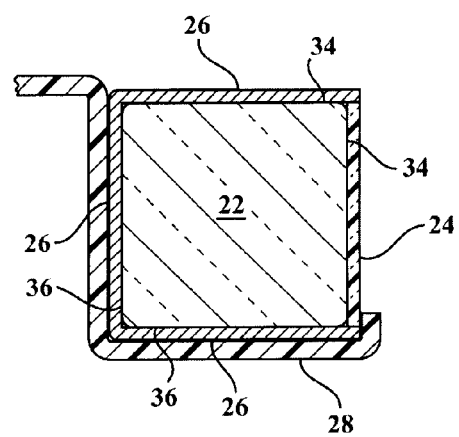
FIG. 3 is a cross-sectional view of the light guide of FIG. 1 disposed in a housing of FIG. 1.
Figure 12:
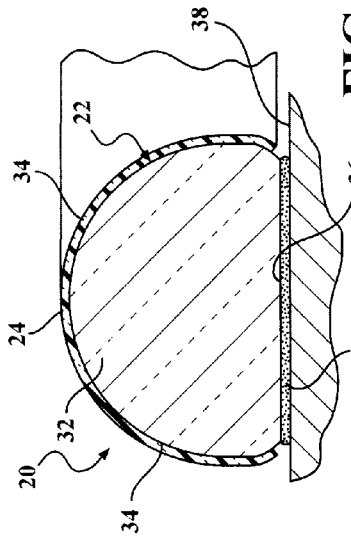
FIG. 12 is a cross-sectional view of the lighting assembly including several different coatings.
Figure 17:
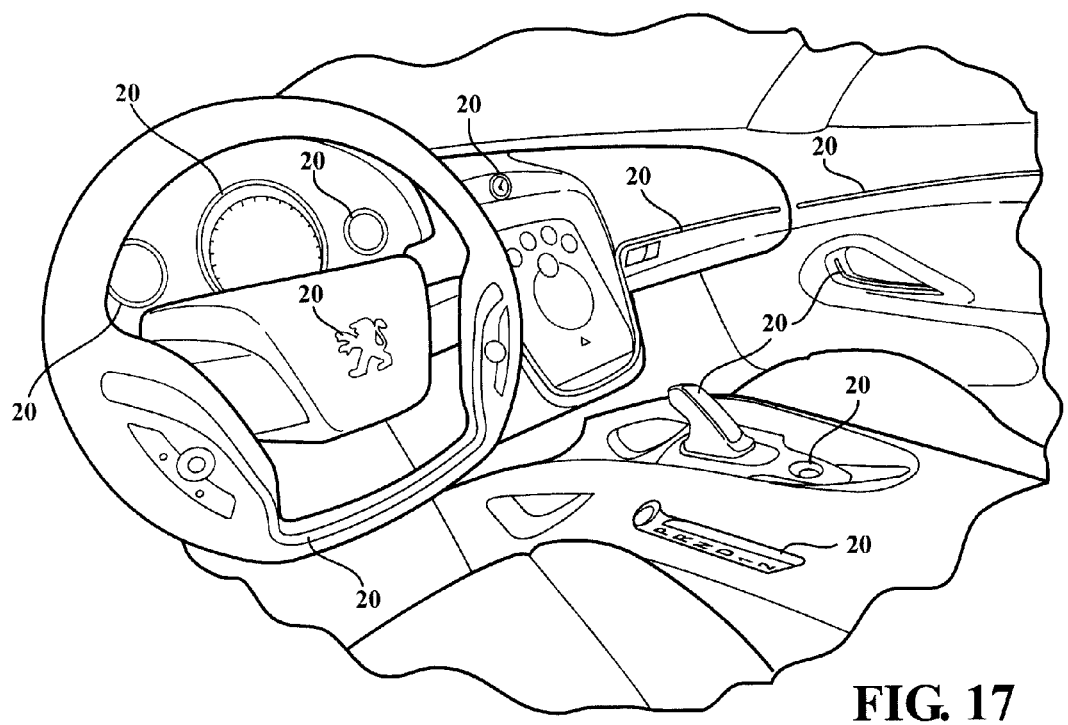
FIG. 17 is perspective view of a portion of a passenger compartment of an automotive vehicle showing numerous applications including the lighting assembly.

The light guide 22 is also referred to as a waveguide or light pipe by those of skill in the art. The light guide 22 is formed of a light transmissive material, such as resin, acrylic, or any other suitable material known in the art. The material of the light guide 22 has a dull appearance, rather than an attractive aesthetic appearance. The light guide 22 typically includes an elongated body 30 extending between opposite ends 32, as shown in FIG. 10. The light guide 22 transmits light outwardly and also propagates light through the light transmissive material by internal reflection. The elongated body 30 presents a three dimensional shape, such as a rectangular prism, as shown in FIGS. 1-3 or a cylinder, as shown in FIGS. 10 and 11. The light guide 22 includes an outward surface 34 extending lengthwise along the elongated body 30 between the ends 32. The outward surface 34 faces outwardly, away from the housing 28, as shown in FIG. 10. The light guide 22 also includes an inward surface 36 adjacent the outward surface 34 and extending lengthwise between the ends 32. The inward surface 36 faces inwardly, toward the housing 28, as shown in FIG. 10. The outward surface 34 and inward surface 36 may have a surface area equal to one another or surface areas different from one another, depending on the design of the housing 28 and the light guide 22. For example, the housing 28 may surround the light guide 22 and extend along a majority of the surfaces 34, 36 of the light guide 22, as shown in FIG. 11, so that the inward surface 36 has a surface area greater than the outward surface 34. The surfaces 34, 36 of the light guide 22 are generally smooth and free of imperfections capable of diffracting light, but may include a portion being rough to direct or scatter light in a predetermined direction, as shown in FIG. 12. At least one of the ends 32 of the light guide 22 may be chamfered to direct light in a predetermined direction, as shown in FIG. 10. The light guide 22 is formed into a predetermined shape by injection molding, extrusion, or other methods known in the art. The elongated body 30 of the light guide 22 can include curves, bends, or other shapes between the ends 32. For example, the light guide 22 can extend along a cup holder 40 and to present a plurality of curves, as shown in FIG. 1. The light guide 22 may be formed into other three dimensional shapes, such as a company logo, as shown in FIG. 17.

Figure 14:
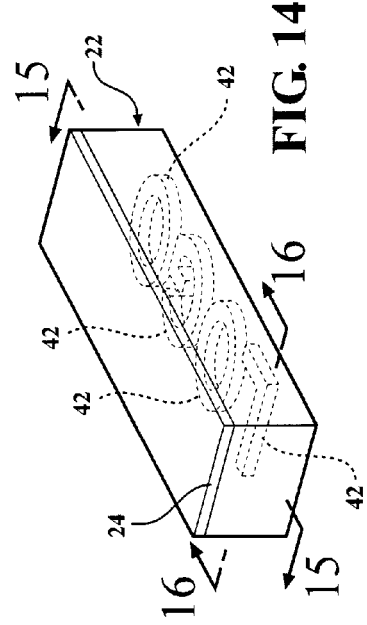
FIG. 14 is a perspective view of the lighting assembly wherein the light guide includes an non-light transmissive element molded therein.
Figure 15:
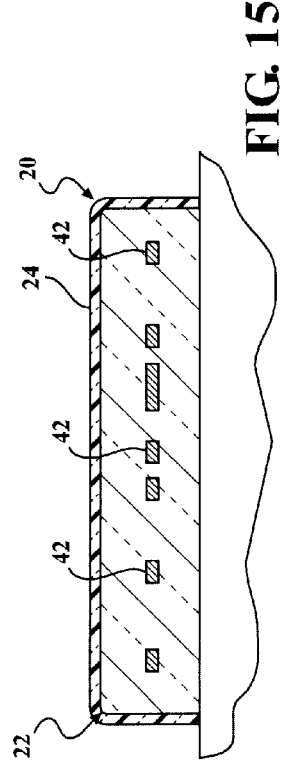
FIG. 15 is a cross-sectional side view of the lighting assembly of FIG. 14 along line 15.
Figure 16:
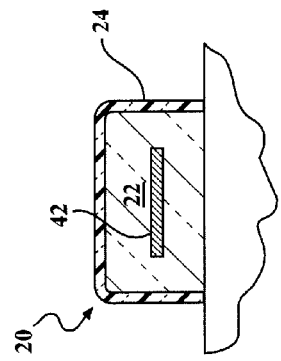
FIG. 16 is a cross-sectional view of the lighting assembly of FIG. 14 along line 16.

The light guide 22 may include a non-light transmissive element 42 molded to the light transmissive resin material of the light guide 22, as shown in FIGS. 14-16. The non-light transmissive element 42 is formed of an opaque material, such as a resin material having a black color. The light transmissive material surrounds the non-light transmissive element 42. The non-light transmissive element 42 has a predetermined shape, such as a company logo. The light transmissive material can also include a plurality of individual components, such as a plurality of letters spelling a company name. Light is directed around the non-light transmissive element 42 so that in dark environments the company logo is surrounded by light and clearly visible, as shown in FIG. 14. In well-lit environments, the coatings 24, 26 on the light guide 22 cover and prevent visibility of the non-light transmissive element 42.

The light transmissive coating 24 of the assembly 20 is disposed on the outward surface 34 of the light guide 22. The light transmissive coating 24 may be disposed on the entire outward surface 34, or a portion of the outward surface 34, as shown in FIG. 3. The light transmissive coating 24 allows light to transmit therethrough in dark environments and provides a decorative appearance, such as a reflective metallic trim in well-lit environments. The light transmissive coating 24 may be translucent, such as a tinted film, allowing light to transmit therethrough while disguising the dull resin of the light guide 22. The light transmissive coating 24 is disposed directly on the light transmissive material of the light guide 22. In other words, there are no components between the light transmissive coating 24 and the light guide 22. The light transmissive coating 24 may be disposed on the inward surface 36 of the light guide 22, in addition to being disposed on the outward surface 34.

Figure 8:
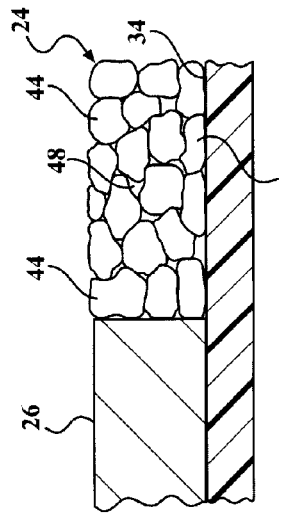
FIG. 8 is an extremely enlarged view of a portion of FIG. 6.
Figure 9:
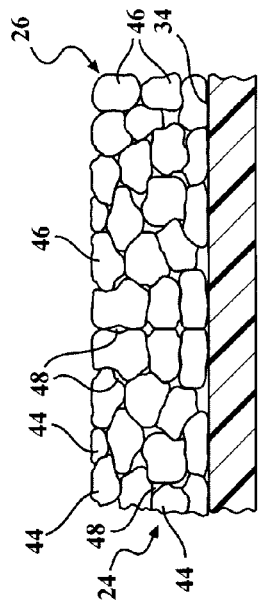
FIG. 9 is an extremely enlarged view of a portion of FIG. 7.

The light transmissive coating 24 typically includes a plurality of first opaque particles 44 preventing light from transmitting therethrough among a plurality of pores 48 allowing light to transmit therethrough, as shown in FIGS. 8 and 9. The first opaque particles 44 typically include a metal, such a aluminum, chromium, and brass. The first opaque particles 44 are made up of molecules at atomic size/level. The pores 48 have a diameter that is at the atomic size/level. The first opaque particles 44 and pores 48 of the light transmissive coating 24 are microscopic and not visible by the naked eye but are visible under a microscope. The light transmissive coating 24 has a thickness of 0.2 micrometers to 0.5 micrometers. The light transmissive coating 24, including the first opaque particles 44 and pores 48, is typically a vacuum metalized coating formed by a vacuum metallization process, which will be discussed further below. However, the light transmissive coating 24 may be another type of coating including first opaque particles 44 and pores 48. The light transmissive coating 24 may be disposed over the entire inward surface 36 and outward surface 34 or over predetermined areas, either symmetrically or asymmetrically.

The lighting assembly 20 may include the non-light transmissive coating 26 formed of an opaque material on at least one of the surfaces 34, 36 or portions of the surfaces 34, 36 of the light guide 22, as shown in FIG. 3. The non-light transmissive coating 26 prevents light from transmitting therethrough and re-directs light back into the light guide 22 and then through the light transmissive coating 24 to a predetermined direction. The non-light transmissive coating 26 may be disposed adjacent, around, or between the light transmissive coating 24. The non-light transmissive coating 26 is disposed directly on the light transmissive material of the light guide 22. In other words, there are no components between the non-light transmissive coating 26 and the light guide 22.

Figure 4:
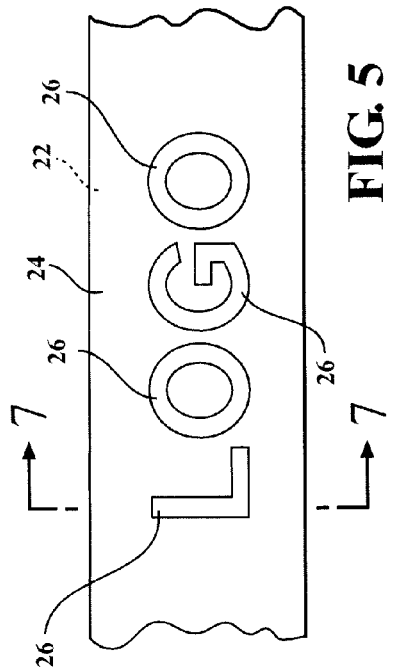
FIG. 4 is a top view of the lighting assembly wherein the light transmissive coating forms a predetermined shape on the light guide.
Figure 5:
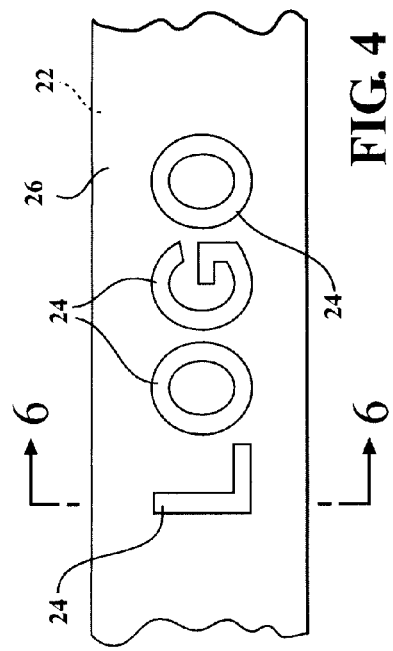
FIG. 5 is a top view of the lighting assembly wherein the non-light transmissive coating forms a predetermined shape on the light guide.
Figure 6:
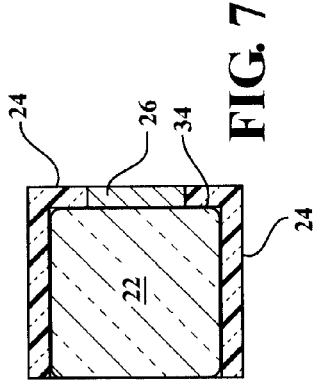
FIG. 6 is a cross-sectional view of FIG. 4 along line 6.
Figure 7:
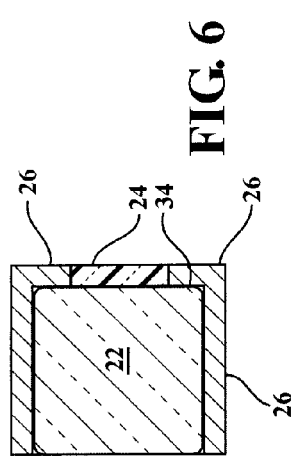
FIG. 7 is a cross-sectional view of FIG. 5 along line 7.

The non-light transmissive coating 26 typically includes a plurality of second opaque particles 46 and is free of pores 48 allowing light to transmit therethrough, as shown in FIG. 8. The second opaque particles 46 typically include a metal, such a aluminum, chromium, and brass. The second opaque particles 46 may be the same as the first opaque particles 44 and the coatings 24, 26 may be disposed adjacent one another on the light guide 22 to provide a uniform appearance to the naked eye, as shown in FIG. 4. For example, the opaque particles 44, 46 of the coatings 24, 26 may each include aluminum so that in a well-lit environment, to the naked eye, the two coatings 24, 26 appear to be a single continuous metallic trim while in a dark environment, only the light transmissive coating 24 allows light to transmit therethrough. The differences between the two coatings 24, 26 of FIG. 4 are identifiable under a microscope, as shown in FIG. 8. The non-light transmissive coating 26 directs light back into the light guide 22, through the light transmissive coating 24, and to a predetermined direction. The non-light transmissive coating 26 may also be a paint, as shown in FIGS. 5, 7, and 9, or another type of coating preventing light from transmitting therethrough. The paint may also appear to be the same material as the vacuum metalized coating to the naked eye, but includes differences identifiable under a microscope, as shown in FIG. 9. The non-light transmissive coating 26 may be disposed symmetrically or asymmetrically over the surfaces 34, 36 of the light guide 22.

At least one of the coatings 24, 26 may form a predetermined design, such as a company logo, on the outward surface 34 of the light guide 22 for transmitting light in a predetermined direction, as shown in FIGS. 4 and 5. The light transmissive coating 24 may form the predetermined design for transmitting light through the predetermined design. The non-light transmissive coating 26 may also form the predetermined design for transmitting light around the predetermined design and re-directing the light through the light transmissive coating 24. For example, the light transmissive coating 24 forms the company logo design and the non-light transmissive coating 26 surrounds the light transmissive coating 24, as shown in FIG. 4, so that in a dark embodiment, the company logo design illuminates. In a second example, the non-light transmissive coating 26 forms the company logo design and the light transmissive coating 24 surrounds the non-light transmissive coating 26, as shown in FIG. 5, so that in dark embodiments, the area around the company logo illuminates and the company logo is clearly visible. As stated above, in well-lit environments the coatings 24, 26 may provide a uniform appearance so that the two coatings 24, 26 appear, to the naked eye, to be a single metallic trim. At least one of the coatings 24, 26 is typically disposed over the entire outward surface 34 to disguise the dull resin of the light guide 22 and provide an aesthetic appearance.

The housing 28 of the light assembly 20 typically includes walls 50 presenting a channel for maintaining the light guide 22 in a predetermined position, as shown in FIGS. 10 and 11. As stated above, the housing 28 extends along the inward surface 36 of the light guide 22. The housing 28 is typically formed of a resin material. The resin material is opaque preventing light from transmitting therethrough. Typically, the housing 28 extends past the ends 32 of the light guide 22 to protect and maintain the entire light guide 22 in the predetermined position, as shown in FIG. 10. A reflective material 54 may be disposed along at least one of the walls 50 of the housing 28, as shown in FIG. 11, for re-directing light escaping through the inward surface 36 of the light guide 22 back into the light guide 22 and through the outward surface 34. The housing 28 may include a lens 56 covering the outward surface 34 of the light guide 22, also shown in FIGS. 10 and 11.

The housing 28 may include a variety of designs, depending on the application in which the housing 28 is used. The housing 28 may include an open box shape, a rounded shape, or a variety of other shapes. The housing 28 may include a connector 58 attaching the housing 28 to a component of a vehicle body or a passenger compartment, as shown in FIG. 10. The connector 58 can include a bolt, clip, screw, adhesive, or another type of connector 58. Alternatively, the housing 28 may be integral with a component of the vehicle body or passenger compartment, as shown in FIG. 1. In one example, the housing 28 includes three walls 50 presenting a channel, as shown in FIG. 11. The light guide 22 is maintained in a predetermined position in the channel by the walls 50. The housing 28 includes an opening 60 for exposing the outward surface 34 and the light transmissive coating 24, and the lens 56 is disposed over the opening 60. In this example, the inward surface 36 of the light guide 22 has a greater surface area than the outward surface 34.

As shown in FIG. 1, the housing 28 may be integral with a cup holder 40 of a passenger compartment. The cup holder 40 includes at least one space 62 for receiving a beverage container, and the housing 28 extends along a curved perimeter 64 of the beverage-receiving space 62. The light guide 22 is disposed in the housing 28 so that the light transmissive coating 24 faces outwardly of the housing 28 and toward the beverage-receiving space 62 to illuminate the space 62. The assembly 20 includes the non-light transmissive coating 26 facing upwardly of the space 62 in addition to the light transmissive coating 24 facing toward the space 62, as shown in FIGS. 1-3. The non-light transmissive coating 26 prevents light from transmitting into the other areas of the passenger compartment, such as a driver's eyes. Disposing the light transmissive coating 24 facing toward the space 62 and the non-light transmissive coating 26 facing upwardly of the space 62 provides convenience and improved safety by allowing a driver to easily locate the illuminated cup-receiving space 62 in dark environments without light from the light guide 22 shining into his or her eyes. In addition, the light transmissive coating 24 is disposed on the outward surface 34 so that the dull resin of the light guide 22 is not visible from the passenger compartment, providing an improved aesthetic appearance in well-lit environments.

Figure 13:
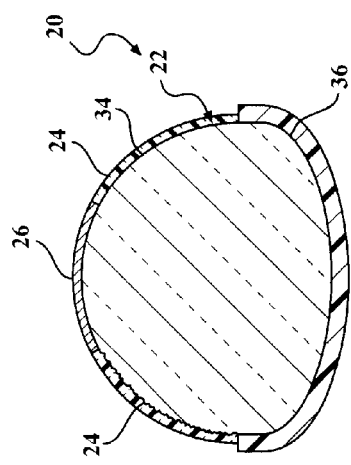
FIG. 13 is cross-sectional view of the lighting assembly wherein the housing is a single surface.

The housing 28 may alternatively include a single surface 38, without the walls 50, as shown in FIG. 13. The connector 58, which is an adhesive, secures the light guide 22 to the single surface 38. In this case, the outward surface 34 has a surface area greater than the inward surface 36. The housing 28 may be the single surface 38 of an instrument panel and the light guide 22 may extend along the single surface 38.

A light source 66 is operatively connected to the light guide 22 to provide light to the lighting assembly 20, as shown in FIG. 10. The light source 66 is typically disposed in the housing 28 at one end 32 for directing light into the end 32 of the light guide 22. The assembly 20 may also include a light source 66 along the elongated body 30 or a plurality of light sources 66 directing light into the assembly 20. The light source 66 may be disposed adjacent an inward surface 36 of the light guide 22 free of the coatings 24, 26 so that the coatings 24, 26 do not limit the amount of light entering the light guide 22. As alluded to above, the light guide 22 propagates the light provided by the light source 66 through the light transmissive material, along the elongated body 30 between the ends 32, by internal reflection. As alluded to above, light from the light source 66 transmits through the light transmissive coating 24 and outwardly of the light guide 22. The light source 66 can include incandescent lamps, light emitting diodes, and input from optical fibers or other light sources 66 known in the art. The assembly 20 may also include a light box 68 operatively connected to the light guide 22 for adjusting light in a predetermined manner, as shown in FIG. 10.

Figure 18:
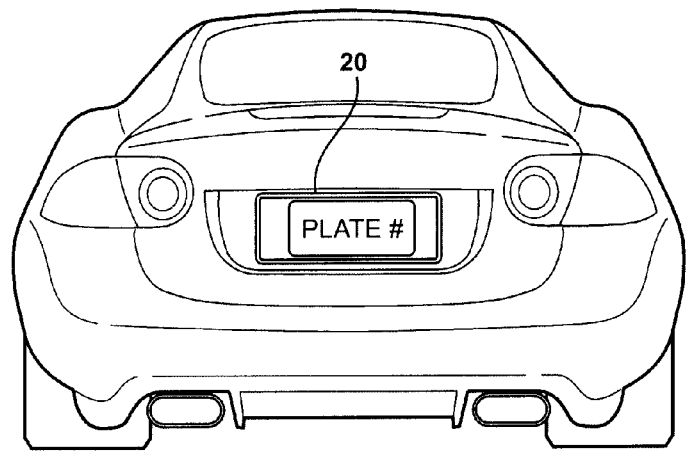
FIG. 18 is a side view of a vehicle exterior including the lighting assembly in a license plate application.

As stated above, the lighting assembly 20 can be used in a variety of applications, including vehicle and non-vehicle applications. However, the assembly 20 is typically used in passenger vehicles to enhance interior and exterior lighting applications and ambiance in the passenger compartment. In well-lit environments, the light assembly 20 appears to be a decorative strip of metal, such as a trim of a passenger compartment, as shown in FIG. 17, or a trim around a license plate, as shown in FIG. 18, rather than a typical light guide 22 of dull resin material. In dark environments, a passenger of the vehicle can locate the cup holder 40, door handle, or another feature of the automotive vehicle by the light guide 22. The light transmissive coating 24 disguises the light guide 22 and provides a desirable aesthetic appearance during the day, and a predetermined display of light at night.

The lighting assembly 20 can be used to enhance other passenger compartment features such as a center counsel, panel trim, gear shift, steering wheel, speedometer, instrument panel, clock, scuff plates, door handle, ceiling trim, reading lamp, map box, scuff plate, door handle, and door panel trims. The lighting assembly 20 can also be used in exterior vehicle applications, such as a running light, door handle, park light, signal, or another exterior vehicle lighting application. The lighting assembly 20 can also be used to illuminate a company logo disposed on the interior or exterior of a vehicle body. Like the cup holder 40 example described above, the lighting assembly 20 is disposed so that the light transmissive coating 24 of the light guide 22 faces outwardly of the housing 28 and the coating 24 disguises the dull resin of the light guide 22. In each application, the lighting assembly 20 appears to be an trim component in well-lit environments and provides desired patterns of light in dark environments.

The lighting assembly 20 is formed by disposing a light transmissive coating 24 on a light guide 22 and extending the light guide 22 along a housing 28 so that the light transmissive coating 24 faces outwardly of the housing 28. The light guide 22 is typically formed by injection molding a light transmissive material, such as resin, into the elongated body 30 extending between the opposite ends 32. The method may include molding the non-light transmissive element 42 formed of an opaque material into the light transmissive material of the light guide 22.

The coatings 24, 26 may be applied to the light guide 22 by a brush, spray, sputtering, or other methods. The method may include forming a plurality of pores 48 microscope in size in a coating to provide the light transmissive coating 24. The pores 48 of the light transmissive coatings 24 are formed by vaporizing the coating, such as by a vacuum metallization process or another process of forming pores 48. The vacuum metallization process includes disposing the light guide 22 in a vacuum chamber prior to disposing the coating on the light guide 22. The process next includes disposing the coating on the light guide 22 and then vaporizing the coating by applying a pressure of about $10^3$ to about $10^4$ torr to the vacuum chamber and applying heat to the vacuum chamber until the plurality of pores 48 are formed in the coating. The coating then condenses on the light guide 22 to provide the light transmissive coating 24 on the outward surface 34 and optionally on the inward surface 36. The light guide 22 is then removed from the chamber and the method may include disposing the non-light transmissive coating 26 on the light guide 22 adjacent the light transmissive coating 24.

Obviously, many modifications and variations of the present invention are possible in light of the above teachings and may be practiced otherwise than as specifically described while within the scope of the appended claims. These recitations should be interpreted to cover any combination in which the inventive novelty exercises its utility. In addition, the reference numerals in the claims are merely for convenience and are not to be read in any way as limiting.

The invention claimed is:

1. A lighting assembly comprising;
  a light guide formed of a light transmissive material for transmitting light therethrough,
  a housing extending along and maintaining said light guide in a predetermined position,
  a light transmissive coating disposed on said light guide and facing outwardly of said housing,
  said light transmissive coating including a plurality of first opaque particles and a plurality of pores among said first opaque particles, said first opaque particles preventing light from transmitting therethrough, and said pores being microscopic in size and allowing light to transmit therethrough,
  a non-light transmissive coating disposed on said light guide adjacent said light transmissive coating and preventing light from transmitting therethrough,
  said non-light transmissive coating including a plurality of second opaque particles, and said second opaque particles being formed of the same material as said first opaque particles.

2. An assembly as set forth in claim 1 wherein said first opaque particles include a metal.

3. An assembly as set forth in claim 2 wherein said metal is at least one of aluminum, chromium, and brass.

4. An assembly as set forth in claim 1 wherein said first opaque particles of said light transmissive coating are microscopic in size.

5. An assembly as set forth in claim 1 wherein said light transmissive coating is a vacuum metalized coating.

6. An assembly as set forth in claim 1 wherein said light transmissive coating and said non-light transmissive coating appear to be the same material.

7. An assembly as set forth in claim 1 wherein said non-light transmissive coating is free of pores allowing light to transmit therethrough.

8. An assembly as set forth in claim 1 wherein at least one of said coatings forms a predetermined design on said light guide for directing light in a predetermined direction.

9. An assembly as set forth in claim 8 wherein said light transmissive coating forms said predetermined design on said light guide adjacent said non-light transmissive coating for directing light through said predetermined design.

10. An assembly as set forth in claim 8 wherein said non-light transmissive coating forms said predetermined design on said light guide around said light transmissive coating for directing light around said predetermined design.

11. An assembly as set forth in claim 8 wherein said predetermined design is a company logo.

12. An assembly as set forth in claim 1 including a light source disposed along said housing for directing light into said light guide.

13. An assembly as set forth in claim 1 wherein said light guide includes a non-light transmissive element formed of an opaque material adjacent said light transmissive material for directing light in a predetermined direction around said non-light transmissive element.

14. An assembly as set forth in claim 13 wherein said non-light transmissive element presents a predetermined design for directing light around said predetermined design.

15. An assembly as set forth in claim 1 wherein said housing is formed of an opaque material preventing light from transmitting therethrough,
  said housing includes a plurality of walls extending along said light guide and maintaining said light guide in the predetermined position, and
  said walls present an opening for exposing said light transmissive coating on said light guide.

16. An assembly as set forth in claim 1 wherein said housing includes at least one connector for maintaining said light guide in the predetermined position.

17. A trim assembly for an automotive vehicle comprising:
  a light guide formed of a light transmissive material for transmitting light therethrough,
  a light transmissive coating disposed on said light guide,
  a housing extending along and maintaining said light guide in a predetermined position so that said light transmissive coating faces outwardly of said housing,
  said light transmissive coating including a plurality of first opaque particles and a plurality of pores among said first opaque particles, said first opaque particles preventing light from transmitting therethrough, and said pores being microscopic in size and allowing light to transmit therethrough,
  a non-light transmissive coating disposed on said light guide adjacent said light transmissive coating and preventing light from transmitting therethrough,
  said non-light transmissive coating including a plurality of second opaque particles, and said second opaque particles being formed of the same material as said first opaque particles.

18. An assembly as set forth in claim 17 wherein said plurality of first opaque particles are microscopic in size and prevent light from transmitting therethrough.

19. An assembly as set forth in claim 17 including a cup holder having a perimeter surrounding a space for receiving a beverage container, said housing extending along said perimeter of said space, and said light transmissive coating facing toward and illuminating said space.

20. A trim assembly as set forth in claim 19 wherein said non-light transmissive coating disposed on said light guide faces upwardly of said space preventing light from transmitting upwardly of said space.

* * * * *